April 25, 1950

A. COUTANT ET AL 2,505,231

CINEMATOGRAPHIC CAMERA HAVING
SEPARABLE GATE FORMING MEANS

Filed Dec. 27, 1946

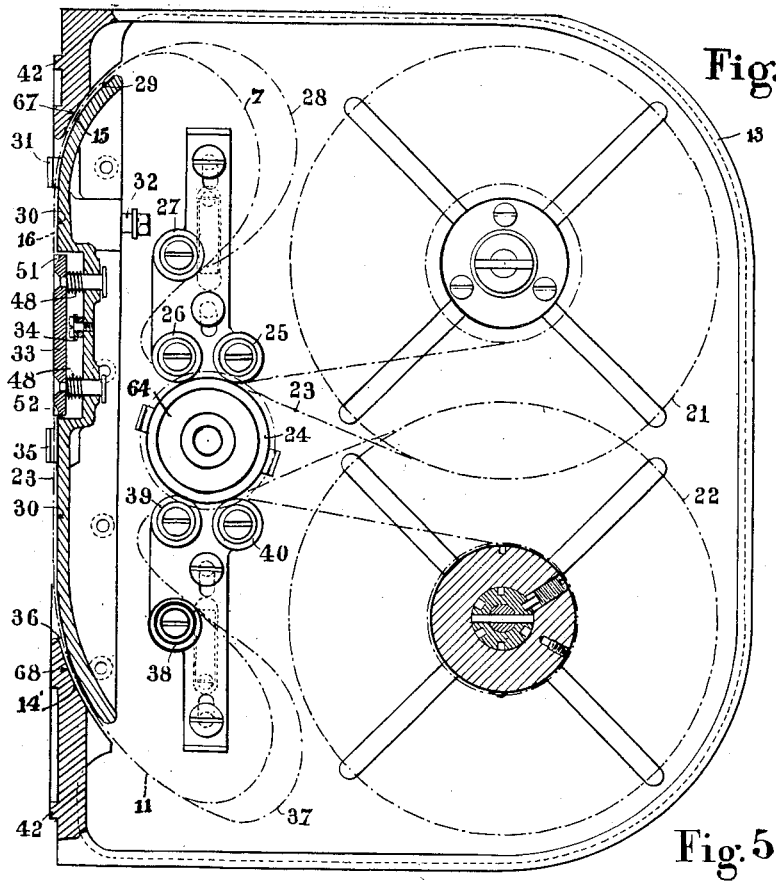

April 25, 1950
A. COUTANT ET AL
2,505,231
CINEMATOGRAPHIC CAMERA HAVING
SEPARABLE GATE FORMING MEANS
Filed Dec. 27, 1946
3 Sheets-Sheet 3

Patented Apr. 25, 1950

2,505,231

UNITED STATES PATENT OFFICE 2,505,231

CINEMATOGRAPHIC CAMERA HAVING SEPARABLE GATE FORMING MEANS

André Coutant and Jacques Mathot,
Paris, France

Application December 27, 1946, Serial No. 718,742
In France January 8, 1945

3 Claims. (Cl. 88—17)

The present invention has for its object improvements in the cinematographic cameras which have more especially for purpose to make easy the change of the reels.

To this effect there is provided a magazine containing the reels and the feed roller; its front face provides the back wall of the gate or passage, and the only parts that project from said magazine are, laterally, the ends of the heel and roller driving shafts and, at the front end, the straight length of film before the front wall of the gate; said magazine is so designed that it can be fitted easily behind the camera lens and preferably that such fitting automatically results in the engagement of the film-shifting prong and of the ends of the driving shafts for the roller and contingently the reels.

An embodiment of this invention is shown by way of indicative and non-limitary example in the appended drawing.

Figures 3 to 8 show a fractional embodiment of a magazine to be used in a small camera for reporting purposes.

Figure 3 is a longitudinal vertical sectional view.

Figure 4 is a front elevational view.

Figures 5, 6 and 7 are cross-sectional views taken on lines IX—IX, X—X and XI—XI in Fig. 4 respectively.

Figure 8 is an elevational view of the inside.

Figure 1:
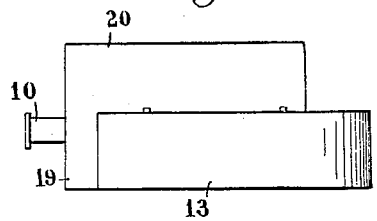
Figures 1 and 2 show a camera equipped with said removable magazine in top plan and front elevational view respectively.

The magazine 13 is closed and light-tight. Two slits 15 and 14' provide for the emergence of the straight loop 7 and the re-entry of the straight loop 11; said slits are sufficiently long and curved to exclude every detrimental consequence of a diffusion of the light penetrating from the outside through said slits; only the straight length 16 of the film lies outside of the magazine 13, in addition to the ends of the shafts for the rotation of reels 1 and 2 on one hand and of rollers 4 and 6 on the other hand.

Preferably, some suitable device is provided in order to obtain that the fitting of said magazine on the camera 19 automatically results in the engagement of the film-shifting prong into the sprocket holes in the film 16 on one hand and the operative connection of the ends of the driving shafts with the related driving mechanism. The complementary portion 20 of the camera is of very compact construction and houses the motor and the driving mechanism.

Figure 2:
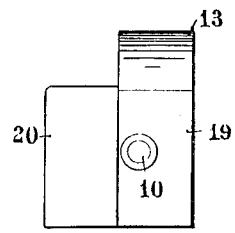
Figure 8:
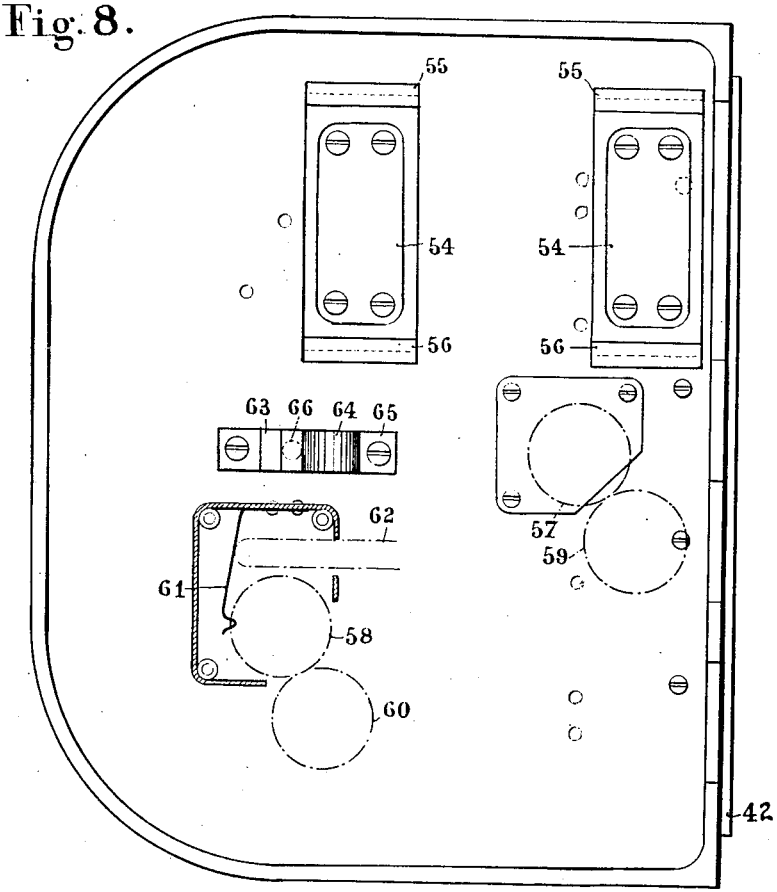
Figure 4:
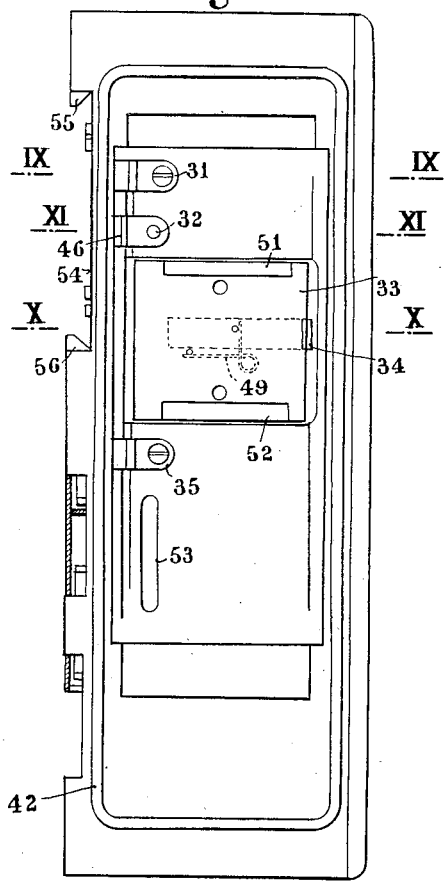

As an illustration of the manifold applicability of the invention, a magazine or loading box is shown in Figs. 3 to 8 which is to be used in small reporting cameras and in which the reels are arranged in one plane, viz.: that in which the whole film is rolled out and up, all the safety and connecting devices included in the same can be used in a magazine such as the one shown in Figs. 1 and 2.

The film 23 is pressed against the feed roller 24 by pressing rollers 25, 26; an additional roller 27 initiates the floating loop 28 which ends at the entrance 29 of the slit whose curvature provides a light-tight joint at the emergence of the film out of the magazine. The film length at the outside of the latter is held in contact with the back wall 30 of the channel, which is a part of the magazine, by the fixed lug 31, the loading prong 32, the pressing member 33, the spring lug 34 and the fixed lug 35; it passes into the gate emergence slit 36 the curvature of which provides a light-tight joint at the re-entry of the film into the magazine. The film then forms the floating loop 37 by the action of the guide roller 38, is pressed against the feed sprocket roller 24 by pressing rollers 39 and 40 and winds up on the take-up reel 22.

The channel front wall 41 is a part of the camera; when the loading box is in operative position a clearance is left between the front and back walls 41 and 30 of the channel which is just sufficient to allow the film 23 to pass through; the pressing member 33, besides, presses the film against the front wall 41 of the channel around the optical axis of the camera. A light-tight joint is provided all around that portion of the film which is at the outside of the magazine, it consists in a tongue 42 which surrounds the film length considered on the front face of the loading box and which co-operates with a groove 43 in which it is received and which is provided for that purpose in the periphery of the front wall 41 of the channel, on the back face of the camera.

Particularly visible in Fig. 5 are the fixed lug 31, the film 23 between the back and front walls 30 and 41 of the channel, the tongue 42 and the groove 43 providing a light-tight joint.

Figure 7:
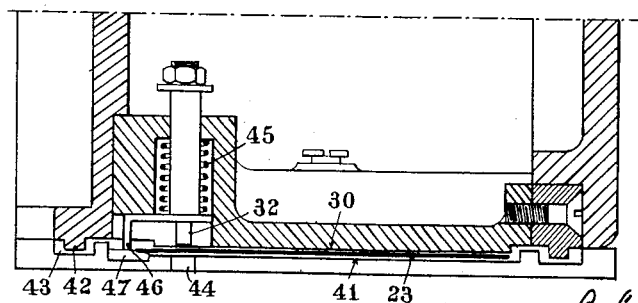

The loading prong 32 is particularly visible in Fig. 7; it is located in register with a hole 44 drilled for that purpose in the channel front wall 41; it is permanently urged by a spring 45 towards said channel front wall; a lug 46 rigid with the prong projects slightly beyond the latter and co-operates with a fixed strip 47 which slightly projects from the channel front wall 41 for the purpose of pushing the prong 32 into inoperative position as the loading box is being fitted in the camera.

Consequently, said loading prong 32 is effective, in combination with the lugs 31 and 35, to keep the film length 23 at the outside of the loading box in the desired position only when the latter is loose from the camera proper.

The pressing member 33, visible notably in Figs. 3 and 6, is permanently urged by springs 48 towards the front wall 41 of the channel; Fig. 6 also shows the side-play take-up spring lug 34 which a spring 49 visible in Fig. 4 urges toward the left of the figure; said lug presses the film edge against the fixed lugs 31 and 35 and against the central guide 50 (Fig. 6) provided in the front wall 41 of the channel; rounded edges 51 and 52 are provided at the top and the bottom of the pressing member 33.

In addition, the channel back wall 30 is formed with a vertical slot 53 (Fig. 4) in register with the sprocket holes in film 23 and intended to allow the film-shifting prong to operate freely, said prong being rigid with the camera.

Secured on the outside of the inner jaw of the loading box are a pair of plates 54 (Fig. 8) having bevelled upper and lower edges 55 and 56 intended to allow said box to be fitted on the camera; projecting from the same face are the gear wheels 57 and 58 keyed on the shafts that drive the feed roller 24 and the take-up reel 22, respectively; said gear wheels 59 and 60 projecting from the related side face of the camera and the axes of which are widely offset vertically so as to provide for an easy engagement as the loading box is being fitted on; the gear wheel 58 is locked by a spring 61 when the loading box is not in working position; a prong 62 rigid with the camera throws the said spring into inoperative position and unlocks the gear wheel 58 as the loading box is being fitted on the camera. A stop 63 and a suitable boss 64, both rigid with a plate 65 secured on the side jaw of the camera co-operate with a bolt 66 to keep the loading box in the correct service position.

It will be appreciated that in order to set the loading box into position it is only necessary to hold up its inner jaw to the related jaw of the camera at suitable height, to engage the bevels 55 and 56 of plates 54 on mating projections on the adjacent face of the camera and to push the loading box forward by some centimeters to lock the same automatically and keep it in position; the film-shifting prong being engaged in a sprocket hole, or ready to be so, and the gear wheels 57 and 59, 58 and 60 being in engagement.

The loading box casing is provided at the upper and lower ends of its front face with rounded portions 67 and 68 the curvature of which is the same as that of the upper and lower ends of the back wall 30 of the channel, which thus provide a protraction of the channel upward and downward and which act as a seal to light.

Although the arrangement described and shown is a particularly simple one and operates satisfactorily, wide modifications of the same are obviously possible within the scope of this invention.

Only cinematographic cameras have been considered in the preceding; nevertheless, the invention is also applicable to photographic cameras.

What we claim as our invention and desire to secure by Letters Patent is:

section including at least one lens and having a rear face a portion of which is adapted to provide the front wall of the camera gate, a second section removably affixed to the rear end of said first section consisting of a light-tight magazine including a pay-off reel support, a wind-up reel support, a front face designed in part to provide the rear wall of said gate, a first slit in said front face through which the film to be exposed is led from the pay-off reel out of the magazine, a second slit in said front face through which the film once exposed is led back into the magazine to be wound up, a resilient presser between said slits to press the film section to be exposed against that portion of the rear end face of the first section which provides the front wall of the gate in the vicinity of the optical axis of the camera, means to interlock the two sections, means on each of said sections adapted in the interlocked state of the same to provide a light-tight joint about that film portion which stands ready for exposure, a stationary side guide for the film provided in that portion of the rear end face of the first section which provides the front wall of the gate and a resilient side hook provided on the second section of the camera opposite said film side guide and adapted to keep the film in engagement with said fixed side guide.

2. A cinematographic camera comprising a first section including at least one lens and having a rear face a portion of which is adapted to provide the front wall of the camera gate, a second section removably affixed to the rear end of said first section consisting of a light-tight magazine including a pay-off reel support, a wind-up reel support, a front face designed in part to provide the rear wall of said gate, a first slit in said front face through which the film to be exposed is led from the pay-off reel out of the magazine, a second slit in said front face through which the film once exposed is led back into the magazine to be wound up, a resilient presser between said slits to press the film section to be exposed against that portion of the rear end face of the first section which provides the front wall of the gate in the vicinity of the optical axis of the camera, means to interlock the two sections, means on each of said sections adapted in the interlocked state of the same to provide a light-tight joint about that film portion which stands ready for exposure, a feather on the end face of any one of the sections of the camera adjacent to that portion of it which provides the one wall of the gate and a groove in the end face of the other section of the camera to fit said feather adapted in combination therewith to provide a light-tight joint about the gate in the interlocked condition of the two sections of the camera.

3. A cinematographic camera comprising a first section including at least one lens and having a rear face a portion of which is adapted to provide the front wall of the camera gate, a second section removably affixed to the rear end of said first section consisting of a light-tight magazine including a pay-off reel support, a wind-up reel support, a front face designed in part to provide the rear wall of said gate, a first slit in said front face through which the film to be exposed is led from the pay-off reel out of the magazine, a second slit in said front face through which the film once exposed is led back into the magazine to be wound up, a resilient presser between said slits to press the film section to be exposed against that portion of the rear end face of the first secin the vicinity of the optical axis of the camera, means to interlock the two sections, means on each of said sections adapted in the interlocked state of the same to provide a light-tight joint about that film portion which stands ready for exposure, a fixed side hook provided on the front face thereof between the slits therein adapted to guide the film and a resilient side hook provided opposite said fixed side hook and adapted to press the film against said fixed side hook.

ANDRÉ COUTANT.
JACQUES MATHOT.

REFERENCES CITED

The following references are of record in the file of this patent:

UNITED STATES PATENTS

| Number | Name | Date |
|---|---|---|
| 20,595 | Re. Bouveng | Dec. 21, 1937 |
| 1,265,699 | Thomas | May 7, 1918 |
| 1,372,675 | Davis | Mar. 29, 1921 |
| 1,572,648 | Gauriat | Feb. 9, 1926 |
| 1,713,503 | Von Madaler | May 14, 1927 |
| 1,743,027 | Debrie | Jan. 7, 1930 |
| 1,789,220 | Debrie | Jan. 13, 1931 |
| 1,824,709 | Debrie | Sept. 22, 1931 |
| 1,884,609 | Dina | Oct. 25, 1932 |
| 1,933,562 | Michel | Nov. 7, 1933 |
| 1,935,572 | Leventhal | Nov. 14, 1933 |
| 1,942,891 | Wittel | Jan. 9, 1934 |
| 1,962,031 | Porter | June 5, 1934 |
| 2,026,984 | Lyman | Jan. 7, 1936 |
| 2,105,629 | Becker | Jan. 18, 1938 |
| 2,105,630 | Becker | Jan. 18, 1938 |
| 2,143,756 | Bouveng et al. | Jan. 10, 1939 |
| 2,184,331 | Becker et al. | Dec. 26, 1939 |
| 2,228,855 | Sperry | Jan. 14, 1941 |
| 2,277,695 | Foster | Mar. 31, 1942 |

FOREIGN PATENTS

| Number | Country | Date |
|---|---|---|
| 178,997 | Germany | Nov. 27, 1906 |
| 158,242 | Great Britain | Jan. 15, 1921 |